Sept. 3, 1968 T. J. McKEY 3,399,883
SEAT CONSTRUCTION
Filed Aug. 29, 1967

INVENTOR.
THOMAS J. McKEY
BY
*Hauke, Krass & Gifford*
ATTORNEYS

United States Patent Office 3,399,883
Patented Sept. 3, 1968

3,399,883
SEAT CONSTRUCTION
Thomas J. McKey, 451 McKinley, Grosse
Pointe Farms, Mich. 48236
Filed Aug. 29, 1967, Ser. No. 664,068
8 Claims. (Cl. 267—89)

ABSTRACT OF THE DISCLOSURE

A seat construction incorporating a spring formed of a resilient sheet having forward and rearward down turned sides. Each down turned side is connected by a bend to a load-supporting midportion. The forward and rearward longitudinal edges of the sheet are supported in a frame so that the sheet will support a downwardly directed load.

A series of spaced, parallel, tapered slots extend from the midportion of the sheet and toward the supported edges and allows the load-bearing midportion to assume the contour of the load so that the load is spread over a large surface area.

BACKGROUND OF THE INVENTION

1. Field of the invention

This invention relates to load supporting spring assemblies and more specifically to a resilient sheet which is bent and slotted to form a load supporting member of a seat assembly or the like.

2. Description of the prior art

Seat springs are generally made of spring wire that is either coiled or formed and mounted so that it transfers the weight of the occupant from the seat pad to the seat frame. Where the seat is mounted in a vehicle, the spring assembly is normally designed so that it yields sufficiently to provide uniform support and comfort, have a long life and not sag or distort. Furthermore such springs must have a high dampening factor to absorb road vibrations and shock.

Conventional seat springs are formed of tempered spring wire which is either rolled into a spiral formation or formed into a zigzag, ribbon-like formation usually bending the wire into a series of altering loops connected by bars.

The problem with conventional seat assemblies employing a wire type of spring is the occupant's weight is normally concentrated in a relatively few square inches. This highly concentrated stress area manifests itself in the form of body fatigue. Secondly, conventional wire spring assemblies require a large number of braces, stabilizers and other fastening devices. In addition a support pad or foundation pad is necessary in order to transfer the occupant's weight to the springs and to provide a protective means between the springs and the occupant.

The broad purpose of the present invention is to provide an improved spring assembly for a seat or other load-bearing structures having deflection characteristics which spreads the weight of the occupant over a wide area and in addition is formed of a few component parts requiring less padding than conventional seat assemblies and with means for selectively controlling the stiffness of the spring.

SUMMARY

The preferred embodiment of the present invention, which will be subsequently described in greater detail, is described with reference to a vehicle seat assembly. The preferred spring comprises a sheet of spring steel having a load bearing midsection which terminates adjacent its forward and rear edges in a downward bend. The lower edges of the spring are supported by a frame, with the downward bends providing a resilient spring action. It is to be understood that the sheet could be formed of material other than steel such as tempered glass, plywood, fiberglass and the like.

The forward supported edge of the preferred spring may be clamped in a rotatable bar. A handle extending from one end of the bar allows the occupant to rotate the bar thereby controlling the configuration of the bend connecting the supported edges and the midportion. This permits the occupant to vary the stiffness of the seat in order to accommodate various passenger weights and road conditions. The rearward edge of the sheet could as well be mounted in a rotatable, clamping device if a greater degree of control over the stiffness of the spring is desirable.

A row of spaced, parallel slots are formed in the sheet and extend from the midportion of the sheet toward the forward supported edge. Each slot is tapered with its wide end adjacent the load-bearing midportion of the sheet and its narrow end adjacent the supported edge. A second oppose row of slots extends from the load-bearing midportion of the sheet rearwardly toward the rearward supported edge. The second row slots also are tapered each with a wide end adjacent the load-bearing midportion and a narrow end adjacent the rearward supported edge. The slots are closely spaced from one another so that the sheet intermediate each pair of slots forms a tapered load-bearing section having a narrow end adjacent the midportion of the sheet and a wide end adjacent the supported edge. Each of the tapered sections provides a maximum deflection at the point where the load of the occupant is normally concentrated. This permits the sheet to substantially assume the contour of the occupant so that the weight of the occupant is spread over a large surface area with a resulting low unit stress. By lowering the unit stress per area, the occupant experiences a softer ride with a minimum of body discomfort.

In addition to providing a seat construction with a variable stiffness and a low unit stress, the preferred spring assembly requires a minimum of supporting components and the sheet construction eliminates the necessity for the substantial amount of padding that is normally necessary with a spring wire construction.

It is therefore an object of the present invention to provide a spring construction for a seat which provides a greater supporting area for the seat's occupant by providing a resilient sheet of material supported along a pair of opposite edges with a load-bearing portion between the supported edges with tapered slots extending from the load-bearing portion of the sheet toward the supported edges so that the sheet has a predetermined deflection upon the application of a load on the seat.

Another object of the present invention is to provide an improved spring assembly with means for adjusting the stiffness of the spring by providing a resilient sheet having a load-bearing midportion terminating along its front and rear edges in a downward bent section, each of the downward bent sections having its lower edge supported for the transmission of a downward force, and, at least one of the end sections being clamped in a rotatable member which is adapted to adjust the angle between the supported edge and the load-bearing midportion.

Still another object of the present invention is to provide a spring assembly for a load-bearing structure such as a seat assembly or the like comprising a sheet of resilient material having a pair of opposite side edges bent in a direction away from the load-bearing midsection with the bent edges supported in a frame, and a pair of opposed rows of tapered slots extending from the load-bearing midportion toward the supported edges, the wide ends of the slots being formed adjacent the load-bearing midportion so that a series of tapered load-bearing sections having predetermined deflection characteristics are formed intermediate each pair of slots.

Still further objects and advantages of the present invention will readily occur to one skilled in the art to which the invention pertains upon reference to the following detailed description.

*Description of the drawings*

The description refers to the accompanying drawing in which like reference characters refer to like parts throughout the several views in which.

*Description of the preferred embodiment*

Figure 1:
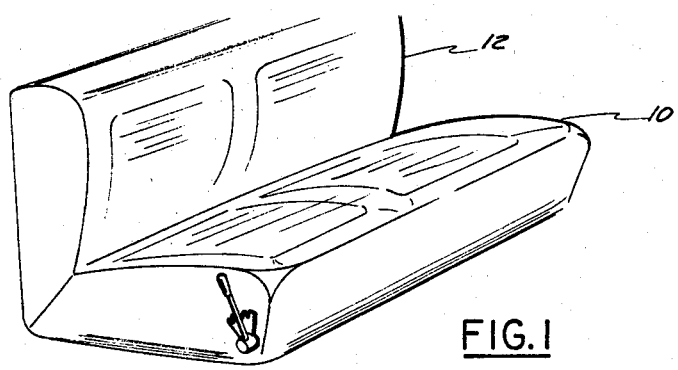
FIGURE 1 is a perspective view of a vehicle seat assembly incorporating a spring made in accordance with the present invention.
Figure 2:
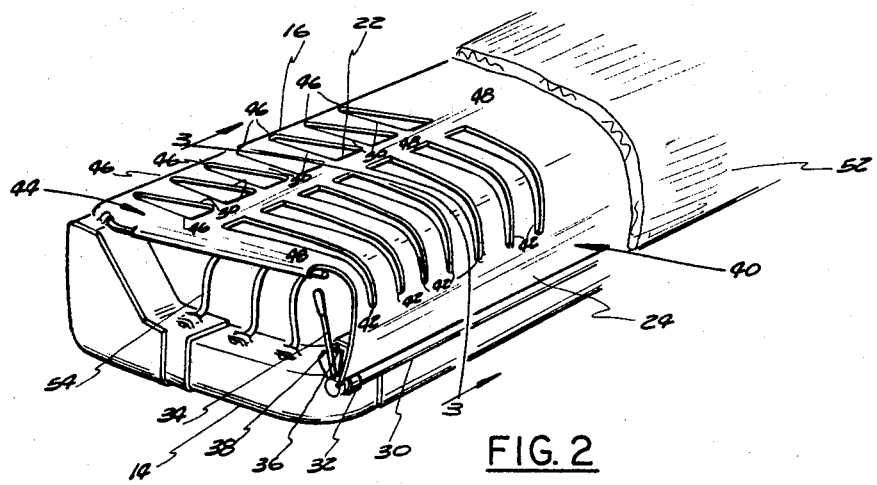
FIGURE 2 is a perspective view of the seat assembly of FIGURE 1 with parts broken away to illustrate the preferred spring.
Figure 3:
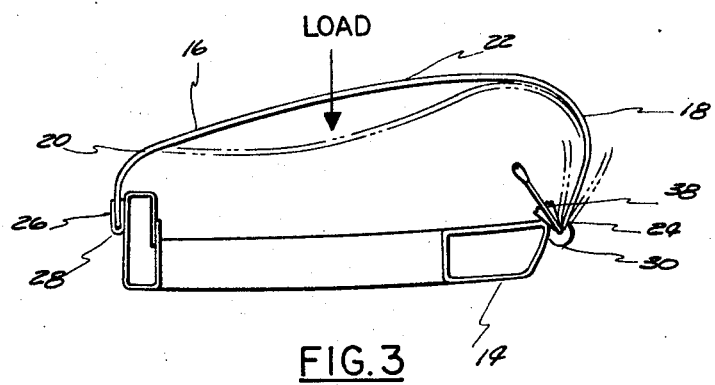
FIGURE 3 is a view taken along lines 3—3 of FIGURE 2 to show the contour assumed by the preferred spring under the influence of a load.

Now referring to the drawings, a vehicle seat assembly is illustrated in FIGURE 1 and has a seat portion 10 and an upright back portion 12. The seat 10 comprises a frame 14 which is normally mounted on the floor of the vehicle or on some form of position adjusting apparatus. The frame 14 is illustrated as being formed of a tubular construction with the front portion of the frame being lower than the rear portion. The particular construction of the frame is not a significant part of the invention other than that it supports the weight of the occupant of the seat assembly which includes a preferred spring 16.

The spring 16 is formed from a sheet of resilient material and preferably of spring steel, however, it could be formed of tempered glass, plywood, fiber glass and the like.

The forward and rear edges of the spring 16 are downwardly bent as at 18 and 20 to form a load-bearing midportion 22, a forward supported edge 24 and a rearward supported edge 26. The rearward supported edge is fixedly mounted in a U-shaped retainer 28 which is fixed as by welding to the frame 14.

The forward supported edge 24 is clamped in a shaft 30 is rotatably mounted in a pair of bearings 32 (only one of which is shown) which are carried by the frame 14. A handle 34 mounted on the end of the shaft 30 carries a latching member 36 which engages a ratchet 38 extending from one of the bearings 32.

The latching member 36 and ratchet 38 permit the forward edge 24 of the spring to be locked in a selected angular position with respect to the load-bearing midportion 22. By adjusting the curvature of the bends 18 and 20, the overall stiffness of the spring can be adjusted. Although only the forward edge 24 of the spring is adjustable, the rearward edge could also be adapted for adjustment thereby permitting the occupant of the seat to have a greater degree of control over the curvature of the bends 18 and 20. This adjustable feature permits the occupant to adapt the stiffness of the spring to accommodate his individual body weight and also to accommodate the road conditions.

A row 40 of tapered slots 42 extends from the midportion 22 toward the forward edge 24 of the spring. Each of the slots 42 has a wide end adjacent the load-bearing midportion 22 and is preferably regularly narrowed to a small end formed adjacent the supported portion forward edge 24. A second row 44 of slots 46 extends from the load-bearing midportion 22 toward the rear supported edge 26 of the spring. The slots 46 are formed in spaced parallel relationship to one another and each tapers from an end adjacent the load-bearing midportion toward a narrow end adjacent the rearward supported edge 26 of the spring. The rows of slots 40 and 44 are closely and opposedly spaced from one another with the wide ends of the slots approximately in the area in which the center of gravity of the occupant is normally supported.

Each pair of slots 42 form the sheet into a series of parallel tapered supporting sections 48 having their narrow ends adjacent the load-bearing midportion and their wide ends adjacent the supported edges of the spring. Similarly the row of slots 44 forms a second series of spaced, parallel, tapered supporting sections 50 having their narrow ends adjacent the load-bearing midportion 22 and their wide ends adjacent the rearward supporting edge 26. The tapered supporting sections 48 and 50 provide the spring with a controlled deflection characteristic. Thus in the area of the spring which has the greatest load, the narrow areas of the supporting sections 48 and 50, in accordance with well known beam theory have the greatest deflection. The wide ends of the supporting sections 48 and 50 have a lesser deflection rate so that the spring tends to assume the contour of a supproted load. The midportion of the spring deflects so that the load is spread over a substantial surface area. This produces a lower unit stress than is associated with a conventional spring.

By providing a substantially smooth, but perforated surface under the seat of the occupant, the occupant experiences a uniform and comfortable support. In addition, the construction of the preferred seat 10 eliminates the necessity for the various foundation pads which are normally required with coil springs to provide an interface between the occupant and the ends of the spring. A sheet of upholstering material 52 covers the spring and is formed of conventional materials.

The side edges of the spring are preferably down turned to accommodate pivotal stabilizing means 54.

It can be seen that the preferred spring eliminates the necessity for conventional coiled or formed wire springs and their associated clips, braces, retainers and the like, and in addition eliminates the necessity for conventional padding which is necessary for springs made of wire. In addition the preferred seat construction provides a softer, more comfortable ride for an occupant, less fatigue to the occupant under driving conditions, and provides means for adjusting the overall stiffness of the seat to accommodate the weight of the occupant under various road conditions.

Having described my invention, I claim:

1. A load-bearing structure comprising:
   (a) a frame; and
   (b) a sheet of resilient material having down turned edges mounted on said frame, said sheet having a load-bearing portion intermediate to said down turned edges, said sheet being perforated to form a series of tapered sections extending from said load-bearing portion toward said down turned edges, and said tapered sections having a width enlarged in a direction from said load-bearing portion toward said down turned edges to form a spring having predetermined deflection characteristics.

2. A load-bearing structure as defined in claim 1, wherein said sheet is formed with a series of tapered slots each having their wide ends adjacent said load-bearing portion.

3. A load-bearing structure as defined in claim 1, wherein said tapered sections are formed by a series of spaced tapered slots.

4. A load-bearing structure as defined in claim 1, wherein said tapered sections are defined by a pair of opposed rows of spaced slots having longitudinal side edges regularly narrowed in a direction from said load-bearing portion toward said down turned edges.

5. A load-bearing structure as defined in claim 4, including means for adjusting the stiffness of said sheet.

6. A load-bearing structure as defined in claim 1, including means for adjusting the stiffness of said sheet, said means comprising means for supporting said down turned sides at a selected curvature relative to said load-bearing midportion.

7. A load-bearing structure as defined in claim 6, including means for attaching one of the down turned edges of said sheet to a rotatable member, and means for rotating said member so that said down turned edge assumes a selected angle with respect to said load-bearing portion.

8. A seat construction comprising:
 (a) a frame including a pair of spaced frame members, at least one of said frame members being supported for rotation about an axis;
 (b) a sheet of resilient material having a load-bearing midportion and a pair of down turned sides each connected by a bend to said load-bearing midportion, the edges of said sides being attached to said spaced frame members, the stiffness of said sheet being defined by the curvature of the bend connectting the side supported by said rotatable frame member; and including a pair of opposed rows of spaced slots extending from said midportion toward said down turned sides, each of said slots having a tapered configuration including a wide end adjacent said load bearing midportion and a narrow end adjacent the attached edge of said sides, said slots forming tapered supporting sections having predetermined deflection characteristics.

References Cited

UNITED STATES PATENTS 2,804,129   8/1957   Propst _____ 267—103
3,273,877   9/1966   Geller et al. _____ 267—89

ARTHUR L. LA POINT, *Primary Examiner.*